United States Patent
Redmond et al.

[11] Patent Number: 5,822,096
[45] Date of Patent: Oct. 13, 1998

[54] OPTOELECTRONIC APPARATUS

[75] Inventors: Ian R. Redmond, Princeton; Eugen Schenfeld, Monmouth Junction, both of N.J.

[73] Assignee: NEC Research Institute, Inc., Princeton, N.J.

[21] Appl. No.: 558,352

[22] Filed: Nov. 16, 1995

Related U.S. Application Data

[62] Division of Ser. No. 340,680, Nov. 16, 1994, Pat. No. 5,619,359.

[51] Int. Cl.$^6$ ..................................................... H04J 14/02
[52] U.S. Cl. ............................ 359/129; 359/127; 359/133; 359/634
[58] Field of Search ...................................... 359/633, 634, 359/127, 129, 130, 131, 133, 347, 348, 349, 175, 176

[56] References Cited

U.S. PATENT DOCUMENTS

| | | | |
|---|---|---|---|
| 3,953,727 | 4/1976 | D'auria et al. | 359/127 |
| 4,707,064 | 11/1987 | Dobrowolski et al. | 359/129 |
| 4,800,556 | 1/1989 | Charlier et al. | 359/129 |
| 5,105,263 | 4/1992 | Shioda | 359/634 |
| 5,179,462 | 1/1993 | Kageyama et al. | 359/634 |
| 5,515,194 | 5/1996 | Kanterakis et al. | 359/127 |

FOREIGN PATENT DOCUMENTS

| | | | |
|---|---|---|---|
| 0092639 | 5/1984 | Japan | 359/127 |
| 0115145 | 5/1988 | Japan | 359/127 |

*Primary Examiner*—Leslie Pascal
*Attorney, Agent, or Firm*—Jeffery J. Brosemer; Arthur J. Torsiglieri

[57] ABSTRACT

A computer system that includes a plurality of processing elements for parallel computation utilizes a free-space optical network for communication between the processing elements. Such a network employs an optoelectronic switch that includes a binary H-type tree for routing signals to selected ones of an array of lasers. Hybrid repeaters are included in the optical paths to generate output optical beams colinear that are with incident input beams.

2 Claims, 3 Drawing Sheets

OPTOELECTRONIC APPARATUS

This is a division of application Ser. No. 08/340,680 filed Nov. 16, 1994, now U.S. Pat. No. 5,619,359.

FIELD OF THE INVENTION

This invention relates to optoelectronic apparatus and more particularly to such apparatus for use in information handling systems.

BACKGROUND OF THE INVENTION

As information handling systems become more complex, and require more information to be handled at greater speeds, they need components of more compact size, greater capacity, and faster speeds. It is widely believed that optoelectronic components are particularly promising for use in such systems because optics offers considerable advantages over pure electronics as a communication medium, as data rates move into the gigabit range. For example, it now appears that free space optics offers considerable advantages over wire leads for the interconnection of processing elements in computer systems that use closely spaced semiconductive chips as the processing elements, as in computers that involve massively parallel computation.

Such optical interconnection networks depend importantly on optical components that are compact, rugged, efficient and scalable for use in large systems. The present invention is directed at providing such apparatus.

The present invention in its preferred embodiments focuses particularly on devices adapted to function in a parallel computation system of the kind described in our copending application, Ser. No. 07/994,220, filed Dec. 18, 1992 having the same assignee as this application. However, such devices should also be useful in various other forms of high speed information handling systems.

In that application, there is described a parallel processing system that divides the processing elements into clusters and includes an interconnect network that is of a three-stage modified-clos type. It uses electronic switches in the first and third stages for switching between processing elements in a common cluster and optoelectronic switches to switch between clusters in the second stage that use free-space light beams for use as the transmission medium between clusters. This system is designed so that generally only two routing decisions need to be made in interconnecting any two processing elements. The present invention provides components that are particularly well adapted for use in the second stage of such a system. Reference can be made to such copending application for a more detailed description.

In such a system, the second stage comprises a plurality of lasers that serve as transmitters and a plurality of photodetectors that serve as receivers, the communications therebetween being by light beams that originate from the lasers and terminate at the photodetectors, the routing therebetween being done by various optical elements.

For such communication, an optoelectronic switch is advantageously employed by means of which one laser in an array of lasers is selectively energized by a transmitting processing element, the selection being dependent on the cluster to which belongs the photodetector of the processing element intended as the destination of the information being transmitted.

In one aspect, the present invention is a device that serves as a suitable optoelectronic switch that permits such selection.

Advantageously, each processing element includes both an information processor and a routing portion and all the routing portions in a cluster are interconnected by way of a local switch that permits each processing element to communicate with all other processing elements in a cluster.

Additionally, information that is generated in the information processor of a processing element and intended for transfer to a different cluster may be transferred by way of its routing portion to the routing portion of a different processing element in the same cluster for transfer by the optical interconnection network.

As a consequence, each routing portion has available to it, for transfer by the optical interconnection network, information from the information processor of each of the processing elements in the cluster.

By use of the routing portions, it becomes possible to couple the information from any processing element of the cluster to any optoelectronic switch in the same cluster.

In a similar fashion, advantageously each photodetector in a cluster is coupled to a routing portion of a processing element, and so can couple to the routing portion of any processing element in the cluster, whereby the information received by the photodetector in the cluster can be transferred to any processing element in the cluster for use by it.

Moreover, a light beam, in its routing from the laser associated with the cluster of the transmitting processing element to the photodetector associated with the cluster of the receiving processing element, may experience considerable attenuation since such routing may involve passage through a number of microlenses and reflection from a number of partially transmissive mirrors.

Accordingly, in another aspect, the present invention is a regenerator that can be inserted in the path of a weak light beam and then used to intercept the light beam, amplify or regenerate it, and send it along on a path that is colinear with the path from which the beam was initially intercepted.

SUMMARY OF THE INVENTION

As mentioned above, in one aspect the invention is a novel optoelectronic switch. This switch is designed to be supplied by an input signal intended for a particular destination, which destination is used to determine which laser of an array of lasers is to be modulated by the input signal. In a particular embodiment, the lasers are arranged in a two-dimensional array in a first semiconductive chip and the input signal is applied to a second semiconductor chip in which there has been formed a switch, advantageously of a binary H-tree configuration, whose leaves form a two-dimensional pattern that matches the two-dimensional pattern of the laser anodes of the first chip. Accordingly, the first chip can be butted against the second chip and there bonded to form electrical contacts between the pads at the ends of the leaves of the H-tree switch in the second chip and the anode electrodes of the lasers of the first chip. The address information associated with the input signal is used by the switch to select the laser appropriate to the intended destination of the signal information. Both chips typically might be of gallium arsenide. However, it is anticipated that soon it will be feasible to integrate the two chips into a monolithic chip. Such an optoelectronic chip should have application in various systems other than that described in the copending application. Additionally, each laser may be of the same wavelength or many different wavelengths may be involved.

In accordance with another aspect of the invention, a light regenerator for insertion in the path of the light beams is formed by a hybrid detector/transmitter that is provided with correction for the detector/transmitter physical position offset. Such correction may be provided in a variety of ways including either the use of v-groove mirrors to compensate for the original detector/laser offset or the addition of a second detector/transmitter that provides a second compensating offset, or the use of controlled polarizations and a birefringent element to provide a compensating offset.

In another aspect, the invention is an arrangement for coupling light beams of different wavelengths into and out of optical channels for use in a wavelength division multiplexing arrangement.

BRIEF DESCRIPTION OF THE DRAWING

The invention will be better understood from the following more detailed description taken in conjunction with the accompanying drawing in which.

DETAILED DESCRIPTION OF THE INVENTION

Figure 1:
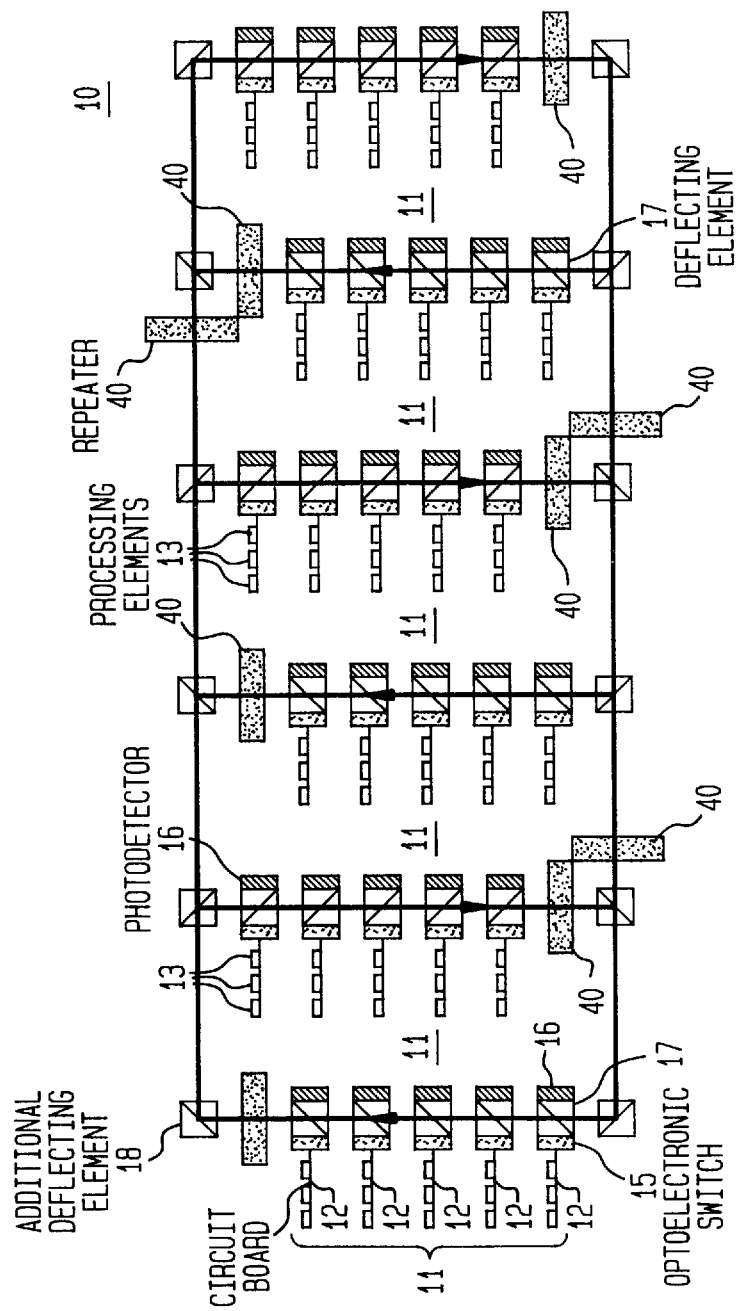
FIG. 1 shows schematically the basic elements of a free space optical interconnection network of the kind to which the invention is primarily applicable.

With reference now to the drawing, the parallel computation system 10 contains a number of columns 11, each column including a plurality of circuit boards 12, each circuit board including a cluster of processing elements 13. The processing elements are advantageously divided among the various boards such that during computations the processing elements between which the communication is expected to be appreciable are located as a cluster on a common board and the communication between processing elements on a common board is controlled by electronic circuitry on the common board. However, communication between clusters on different circuit boards is done optically to avoid the complexity of providing wire leads between the boards, which could be complex when hundreds of circuit boards, each with tens of processing elements are involved, and the destination of signals between processing elements might need to be changed rapidly.

To provide optical communication between the boards each circuit board is provided with a number of optoelectronic switches 15. In accordance with the invention, each optoelectronic switch in a monochromatic system is designed to include a two-dimensional array of lasers in which, each emits light of the same wavelength, but each is positioned to route its beam to a different photodetector associated with a distant circuit boards. The output of a processing element which is to be directed to the input of a processing element not on the common circuit board is applied to the input of the optoelectronic device and switched to the laser aimed at a distant photodetector on the appropriate circuit board for accessing the desired processing element. Then at the receiving end, the output of the receiving photodetector can be routed electronically to the desired processing element. To this end, each circuit board is associated with both a plurality of optoelectronic switches 15 to serve its transmitting processing elements and an array of photodetectors 16 to serve its receiving processing elements. Appropriate deflecting elements 17 are used to deflect the beams emitted by the optoelectronic switches into appropriate paths for travel to their intended destinations and to deflect the beams from their travel paths into the appropriate photodetectors. Additional deflecting elements 18 are located at the ends of each column for routing the beams appropriately through the various columns. Microlenses (not shown) are also typically included along the beam paths. Also included at various points along the beam paths are repeaters 40 to be described more fully below.

Figure 2:
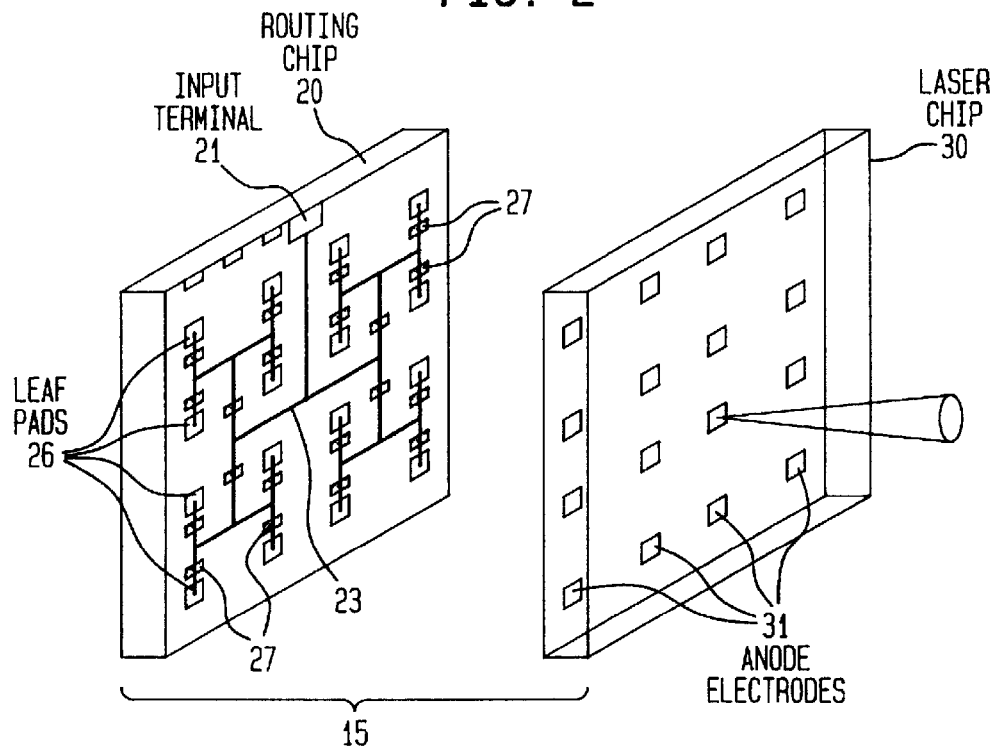
FIG. 2 is a three dimensional exploded view of an optoelectronic switch in accordance with one aspect of the invention.

In FIG. 2 there is shown a three-dimensional exploded view of an optoelectronic switch 15 in accordance with the invention for use at the transmitting end as the source of data streams for routing in a particular channel.

As seen, the switch 15 includes two principal components, a chip 20 which houses the electronic circuitry that provides the routing of the input data to a particular diode laser and a chip 30 which includes an array of lasers of which one is to be selected for emitting a beam of light aimed at a photodetector associated with the cluster of the processing element with which the transmitting processing element is to communicate.

To this end, the 20 chip houses a binary tree switch, preferably of the known H-type configuration, whose input terminal 21, corresponding to the root of the tree is supplied with the signal information to be transmitted by the sending processing element. The tree includes various branches 23 arranged in a common plane so that no branch crosses over another so that pads 26 at the leaf ends form a two-dimensional array, advantageously a square array, as shown. Each of the leaf pads 26 is provided with a solder bump that serves as a connection pad to the tree. The chip 20 further includes a plurality of individual switches 27 that can be set to a high or low resistance state by control signals. The switches can be field-effect transistors connected between branch points of the tree. The switches are appropriately set by the address of the intended destination to route the signal information to the desired leaf of the tree. The signal information is then used to modulate the light beam emitted by the laser to which the chosen leaf is coupled. The chip 20 may also house the driver circuits for proper bias and modulation of the emitting laser.

The second component 30 of the switch 10 comprises a chip in which there has been formed a two-dimensional array of diode injection lasers that are surface emitting to emit a beam substantially circular in cross-section to simplify the optics for the routing of the beams. The anode electrodes 31 of the lasers form a two-dimensional square pattern that closely matches the two-dimensional square pattern of the solder bumps at leaf pads 26 so that when chip 20 is bonded to chip 30 low-loss electrical connections are formed between the binary tree leaf pads and the laser array anode electrodes. A common cathode can be used for all the lasers in the chip.

At some future date, it may become feasible to make the switch 15 essentially all in a monolithic chip, such as a chip essentially of gallium arsenide or other suitable semiconductor. In such a case by appropriate positioning of the various elements in the chip, there may be reduced the need for electrode connections in the chip. Of course, for some applications, it may be feasible to use other materials, such as silicon, for chip 20.

With reference back to FIG. 1, it will be important to include various optical elements, such as microlenses for optically relaying the various laser beams and deflecting elements for routing the various beams between the lasers and the photodetectors. It can be appreciated that some of these paths may be relatively long during which their beams can suffer considerable attenuation.

To compensate for such possible attenuation, it is important to amplify or regenerate some of the beams. It is also important, if the optics is to avoid becoming too complex, to provide such amplification or regeneration in a manner that permits the regenerated beam to maintain essentially the same path it had before amplification or regeneration.

Unfortunately at the present state of technology, there is not available a practical form of colinear optical amplifier so that it is necessary to use hybrid forms of regenerators, usually known as repeaters, that involve optic-to-electronic conversion followed by electronic-to-optic reconversion. Because such operations consume power, it is preferable to regenerate selectively only the weakest signals in a given repeater array and to include multiple repeater arrays in the network.

In FIG. 1, there are also shown included repeaters 40 at various points, advantageously either at the ends of selected columns, or in the paths between columns. The repeaters may take various forms, each of which however is designed to produce an output beam which is not only an amplified version of the input beam but also is collinear with the input beam.

Figure 3:
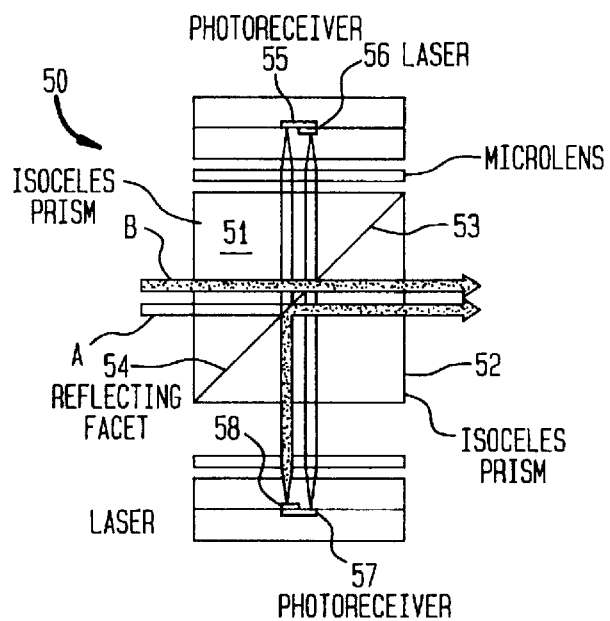
FIGS. 3, 4 and 5 are cross sectional views of three different embodiments of regenerators in accordance with the second aspect of the invention.

One embodiment of such a repeater is shown in FIG. 3. The repeater 50 includes a mirror assembly comprising the pair of right angle isoceles prisms 51, 52 positioned to form a plate interface 53 which is provided with at least one localized reflecting facet 54 where the weak beam A to be regenerated would otherwise pass through the interface. As shown, at the facet this beam is reflected vertically to be incident on a photoreceiver 55 that converts the beam into an electrical signal that is amplified and then used to modulate a laser 56. This laser is positioned to emit a beam that is displaced horizontally from the reflecting facet 54 and that passes largely unaffected through the mirror assembly to be incident on a second photoreceiver 57 that converts the incident beam into an electrical signal. This signal in turn is used to excite laser 58 that generates a new beam designed to pass partially through the mirror assembly but is redirected as it reaches the interface 53 the localized reflecting facet 54 that redirects the incident beam along a path that forms a continuation of the path the beam would have taken through the mirror assembly had it not suffered the initial redirection. As a consequence, the beam now regenerated passes along a collinear extension of its original path. Moreover, a beam not needing regeneration, such as beam B, passes through the interface 53 at a point free of any reflecting facet and so is little affected by passage through the mirror assembly.

It is, of course, possible to include several reflecting facets at interface 53 to deflect additional beams for regeneration in similar fashion to form a repeater array for a number of beams.

Figure 4:
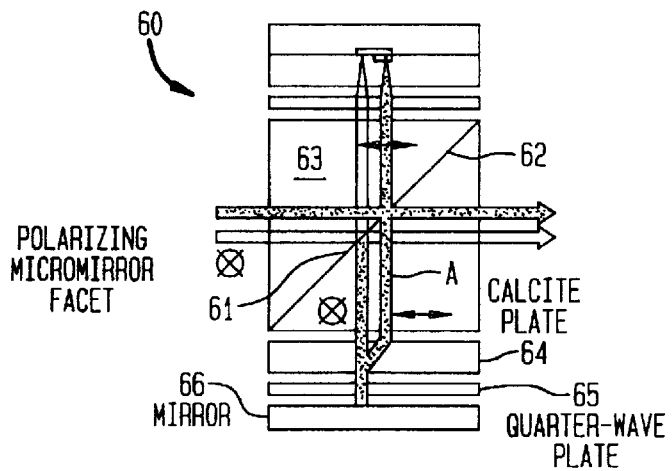

An alternative assembly is shown in FIG. 4. The repeater 60 differs from that of FIG. 3 in that in place of the second photoreceiver-laser pair, it employs a polarizing micromirror facet 61 at the interface 62 of mirror assembly 63, a birefringent element, such as a calcite plate 64, a quarter wave plate 65 and mirror 66, for displacing the regenerated beam A provided by the photoreceiver-laser pair 67 sufficiently that it is redirected along its original path.

Figure 5:
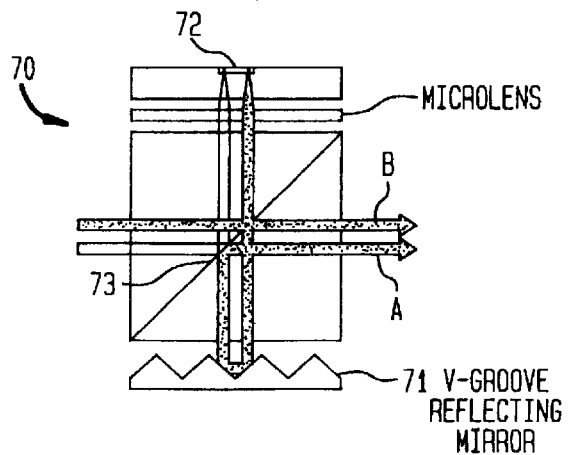

Similarly, as still another embodiment, that may prove to be preferred FIG. 5 shows a repeater 70 that utilizes a V-groove reflecting mirror 71 to displace the regenerated beam A provided by the photoreceiver-laser pair 72 sufficiently that it is redirected along it original path after reflection in reflecting facet 73 at the mirror assembly interface 74.

Wavelength division multiplexing can be accomplished in various ways. In one form, each laser in a given laser array can be of the same wavelength to facilitate the manufacture of such arrays, but the lasers in different arrays would be of different wavelengths.

Alternatively, a single laser array can include many lasers operating at different wavelength. At the present state of the art this would complicate the manufacture of such an array. However, it is likely that advances in the state of the art will some day make such an array readily available.

In some instances, it may be desirable to have a laser array that includes a plurality of groups of lasers, all the lasers in the group emitting the same wavelength, but different groups emitting different wavelengths.

In a wavelength division multiplexing system, a number of light beams of different wavelengths would share a common light path for part of their travel through the network but ultimately they would be separated to target different photoreceivers.

To route the beams of different wavelengths on a common light path appropriately, the optical elements used to deflect the beams should be made wavelength selective as would be apparent to a worker in the art. In particular, the repeaters shown in FIGS. 3, 4 and 5 can be made wavelength selective by choice of the reflecting facets and the wavelength of the regenerating laser.

In a monochromatic system in which all the light beams are of the same wavelength, a large number of beam paths is needed. The number of beam paths needed can be reduced by using wavelength division multiplexing in which each optical path accommodates a plurality of beams each of a different wavelength.

Figure 6:
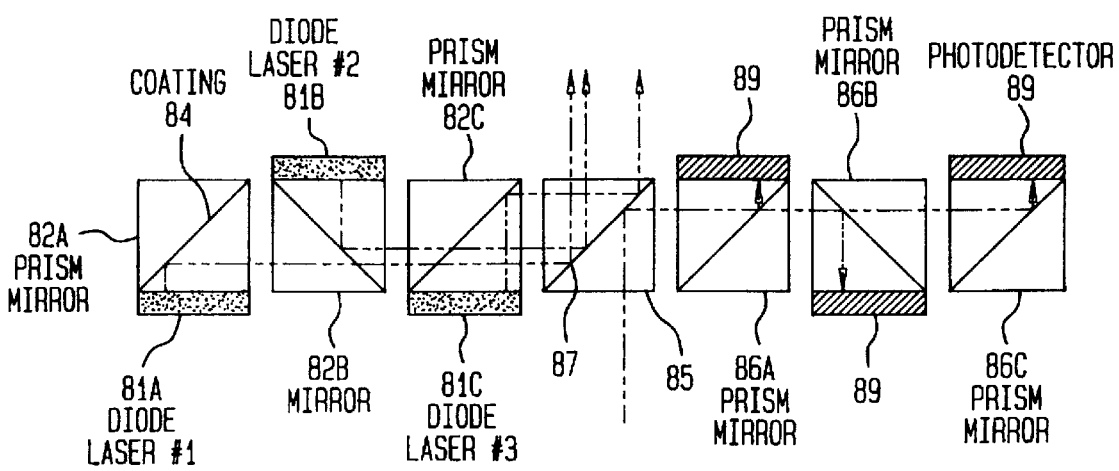
FIG. 6 shows an arrangement for coupling a plurality of beams of different wavelengths into and out of free space optical channels in accordance with another aspect of the invention.

FIG. 6 illustrates one possible arrangement 80 for coupling into and out of a free space optical network that uses three wavelengths. Three diode laser arrays 81A, 81B and 81C each of a different wavelength are coupled to the optical path by way of a separate mirror assembly 82A, 82B and 82C basically of the kind previously described except that at the interface between the two prisms of the assembly the reflecting facets are replaced by a coating 84 that acts as a narrow band reflection interference filter that deflects the intended wavelength by 90 degrees and transmits all other wavelengths. In this way the beams emitted by the three laser arrays are combined and then deflected by the mirror assembly 85 which does include at the prism interface facets 87 for deflecting the various beams vertically into the main optical channels appropriately.

Conversely, optical beams of the three different wavelengths traveling vertically in the optical channels are deflected horizontally by such reflecting facets for travel horizontally for passage through mirror assemblies 86A, 86B and 86C, which resemble mirror assemblies 82A, 82B and 82C in that each is adapted to deflect selectively different ones of the beams of different wavelengths being used but to transmit all others. In this way beams of particular wavelength may be directed at the appropriate photodetectors 89 in the manner previously described.

These embodiments similarly may be modified to provide for regeneration of multiple beams as previously described.

It should be evident that various other modifications may be made either in the optical interconnection network or the components which have been described without departing from the spirit and proper scope of the invention.

In particular, various design considerations will determine the optimum position of the repeaters in the network, the number of beams to be amplified at a particular repeater and the amount of amplification provided at a given repeater.

What is claimed is:

1. An arrangement for combining a deflecting a plurality of light beams each of a different wavelength band for travel in free space comprising:

a plurality of light sources each of a beam of different wavelength band;

a plurality of means, each for selectively deflecting in a transverse direction a light beam of only a prescribed wavelength band and for transmitting therethrough undeflected, all other light beams outside said prescribed wavelength band wherein each deflecting means is suitably coated to impart the selective deflection characteristic to the deflecting means and that a beam of light entering the deflecting means along a particular path will have only light of a preselected wavelength band deflected in a transverse direction while light outside of the preselected wavelength band will not be deflected but will continue through the deflecting means on the same particular entrance path;

said light sources and deflecting/transmitting means being positioned relative to one another for forming a plurality of light beams of different wavelength bands for parallel flow in free space in a transverse direction; and means positioned in the path of said light beams for deflecting said beams that are flowing in a transverse direction to a longitudinal direction and for deflecting to the transverse direction a beam of prescribed wavelength band that is flowing therethrough in a longitudinal direction.

2. An arrangement in accordance with claim 1 in which the deflecting/transmitting means comprise a mirror assembly of two right angle isosceles prisms bonded together to form an interface that includes means that is reflective of light beams of a prescribed wavelength band and transmissive of light beams outside said prescribed wavelength band and said last-mentioned deflecting means comprise a mirror assembly of two right angle isocoles prisms bonded together to form an interface, the interface including a plurality of receiving facets.

* * * * *